Nov. 18, 1952  F. J. WUNDERLICH  2,618,011
FISH SCALER WITH SCALE GUARD
Filed July 5, 1950

Frederick J. Wunderlich
INVENTOR.

Patented Nov. 18, 1952

2,618,011

UNITED STATES PATENT OFFICE 2,618,011

FISH SCALER WITH SCALE GUARD

Frederick J. Wunderlich, St. Clair Shores, Mich.

Application July 5, 1950, Serial No. 172,064

3 Claims. (Cl. 17—7)

The present invention relates to a hand implement or tool for scaling fish and has more particular reference to a handy guard which, while it does not interfere with the scaling operation, effectively prevents fish-scales from flying up and into the eyes and face of the user.

More specifically, the invention has to do with a suitable handle, a metal or equivalent ring attached securely to the outer end of the handle and serving, through the medium of its scraping teeth, as a scaler. The toothed ring is substantially enclosed in an inverted cup-like guard or shield which serves to trap the fish-scales and to prevent same from being unduly and uncontrollably scattered. The guard is of suitable commercial plastic and yieldingly attached to the handle so that it functions properly.

Novelty is predicated on a cup-shaped guard which is sufficiently deep that the rim portion thereof projects to a plane below the teeth on the ring to virtually cover the teeth and to enable the user to carry the scaler in his pocket or conveniently in a creel with the teeth effectively safe guarded.

More specifically, the invention has to do with a plastic cup which hoods over the scraper ring, there being a radial extension registering with an accommodation notch on one side of the rim, said extension taking the form of a saddle which not only saddles over the handle but affords a flexible connection between the cup and handle.

Other objects and advantages will become more readily apparent from the following description and accompanying illustrative drawings.

In the accompanying sheet of drawings wherein like numerals are employed to designate like parts, throughout the views.

Figure 3:
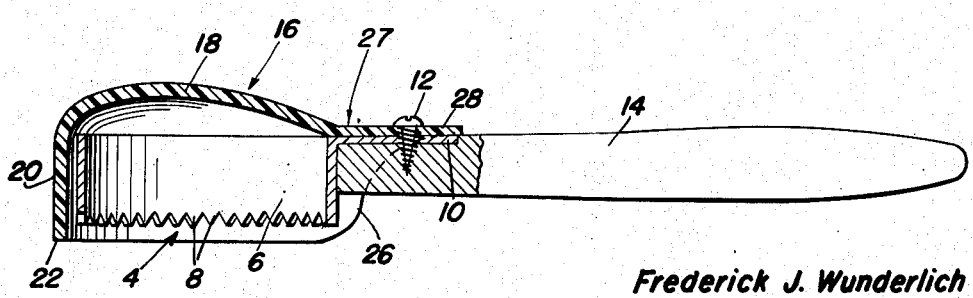
Figure 3 is a view partly in section and partly in elevation illustrating the details of construction with requisite particularity, the section being taken approximately on the line 3—3 of Figure 1, looking in the direction of the arrows.

Referring now to the drawings and particularly with respect to Figure 3 the scaler unit is denoted by the numeral 4 and comprises a metal or equivalent ring 6 open at its top and bottom with serrations forming scraping and scaling teeth 8. The ring is provided with a radial tang 10 which overlaps and is secured by a headed fastener 12 to the adjacent end of the handle 14.

Figure 1:
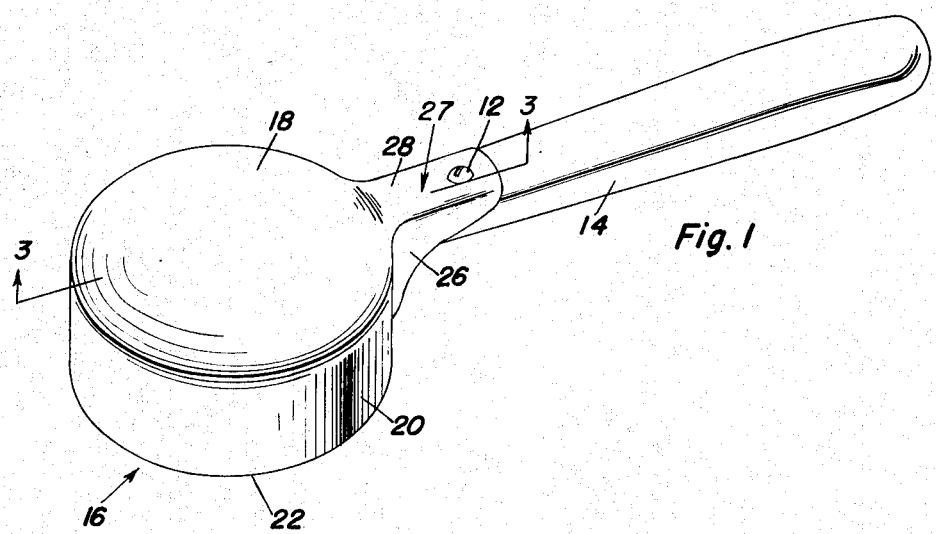
Figure 1 is a perspective view of a fish scaler constructed in accordance with the specific requirement of the instant invention.
Figure 2:
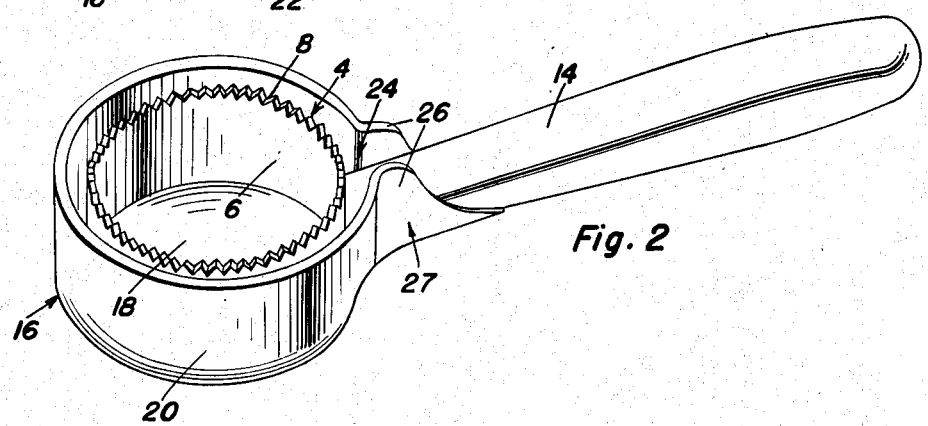
Figure 2 is a perspective view based on Figure 1 with the cup in an upside down or inverted position.

The guard or trapping shield is denoted by the numeral 16. This hoods over and substantially encloses the scaling ring. It is of so-called cup-like form and is sufficiently deep to house the ring 6 in the manner shown in Figure 3. It has a concavo-convex top portion 18 and a circular skirt or rim 20. The cross section of the rim 20 relative to the ring 6 is such that the edge portion 22 projects to a plane beyond the teeth 8. On one side the rim 20 has a clearance and accommodation notch 24 (see Figure 2) for the handle. The notch communicates with a channel-like extension or saddle 27 which saddles over the handle and tang 10 in the manner shown in Figure 3. The side walls of the saddle extend on opposite longitudinal sides of the handle and these are denoted by the numerals 26. The intermediate web or bight portion 28 rests upon the tang 10 and is secured thereto by the same fastening, as brought out in Figure 3. This web is sufficiently pliable or elastic to give the cup a sort of hinging action. That is to say, the inherent spring properties of the saddle means is such as to retain the cup in the position shown in Figure 3 where the teeth are within the confines of the cup. Then, when the teeth are brought into raking or scraping contact with the fish-scales, the pressure exerted against the edge 20 swings the cup out of the way and permits the teeth to come into play.

Despite the great simplicity in design and construction the toothed ring and cup combine to provide a highly practical and efficient contrivance. Using same, users will be able to carry out the scaling operation with little or no difficulty and will be spared the inconvenience of having fish scales flying and scattering, sometimes dangerously, in all directions.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. In a combination article of the class shown and described, a rigid toothed ring open at its top and bottom, a handle, one end of said handle abutting the outer peripheral surface of said ring, means carried by and projecting laterally from and overlapping and rigidly securing the ring to said one end of the handle, a cup including a top portion and a rim portion, said ring fitting wholly within the confines of said cup, said cup being provided on one side with a resiliently connected saddle and said saddle being saddled over said means and one end of the handle and attached to the latter.

2. The structure specified in claim 1, wherein said cup is of a depth appreciably greater than the cross section of the ring, whereby the toothed edge of the ring is completely housed within the confines of the encompassing rim portion of said cup.

3. A fish scaling implement of the class described comprising a rigid open ended ring provided on one edge portion with a lateral outstanding tang and having its opposite edge portion provided with scaling teeth, a handle having one end abutting the ring, said tang overlapping and being fastened to said handle, a shielding cup of commercial plastic, said cup completely enclosing said ring and having a rim provided with a notch and a saddle in alignment with and projecting radially and outwardly of said notch, said saddle being saddled over the handle and tang and the central portion thereof being secured to said tang.

FREDERICK J. WUNDERLICH.

REFERENCES CITED

The following references are of record in the file of this patent:

UNITED STATES PATENTS

| Number | Name | Date |
| --- | --- | --- |
| 1,997,339 | Olson | Apr. 9, 1935 |
| 2,516,414 | Pilliod | July 25, 1950 |
| 2,531,064 | Lindsey | Nov. 21, 1950 |